United States Patent [19]
Cvetnic

[11] 3,826,958
[45] July 30, 1974

[54] ELECTRIC VEHICLE CONTROL

[76] Inventor: John Cvetnic, P.O. Box 34, Pewamo, Mich. 48873

[22] Filed: Aug. 23, 1972

[21] Appl. No.: 282,947

[52] U.S. Cl. .................. 318/113, 318/139, 318/343
[51] Int. Cl. ............................................. H02p 5/06
[58] Field of Search ......... 318/49, 77, 80, 113, 343, 318/139

[56] References Cited
UNITED STATES PATENTS

| | | | |
|---|---|---|---|
| 1,111,510 | 9/1914 | Ward | 180/65 |
| 2,179,547 | 11/1939 | Ernst et al. | 172/239 |
| 2,395,323 | 2/1946 | Framhein | 180/65 |
| 2,465,226 | 3/1949 | Harris | 318/343 |
| 2,539,987 | 1/1951 | Burger | 180/65 |
| 2,578,385 | 12/1951 | Wald | 318/343 |
| 2,581,596 | 1/1952 | Nims | 180/65 |
| 2,661,009 | 12/1953 | Dunnegan | 318/343 |
| 2,740,079 | 3/1956 | Montgomery | 318/343 |
| 3,543,873 | 12/1970 | Toy | 180/65 |

Primary Examiner—Robert K. Schaefer
Assistant Examiner—Thomas Langer
Attorney, Agent, or Firm—Victor J. Evans & Co.

[57] ABSTRACT

An electric vehicle control which utilizes the counter EMF DC motor with a spinning armature serving as a control of power between the DC source and the car motor. A smooth infinite variation from zero to full power is provided simply by varying the speed of the armature by any means such as a mechanical magnetic or hydraulic brake or an alternator which is useful in returning most of the power back to the battery.

1 Claim, 5 Drawing Figures

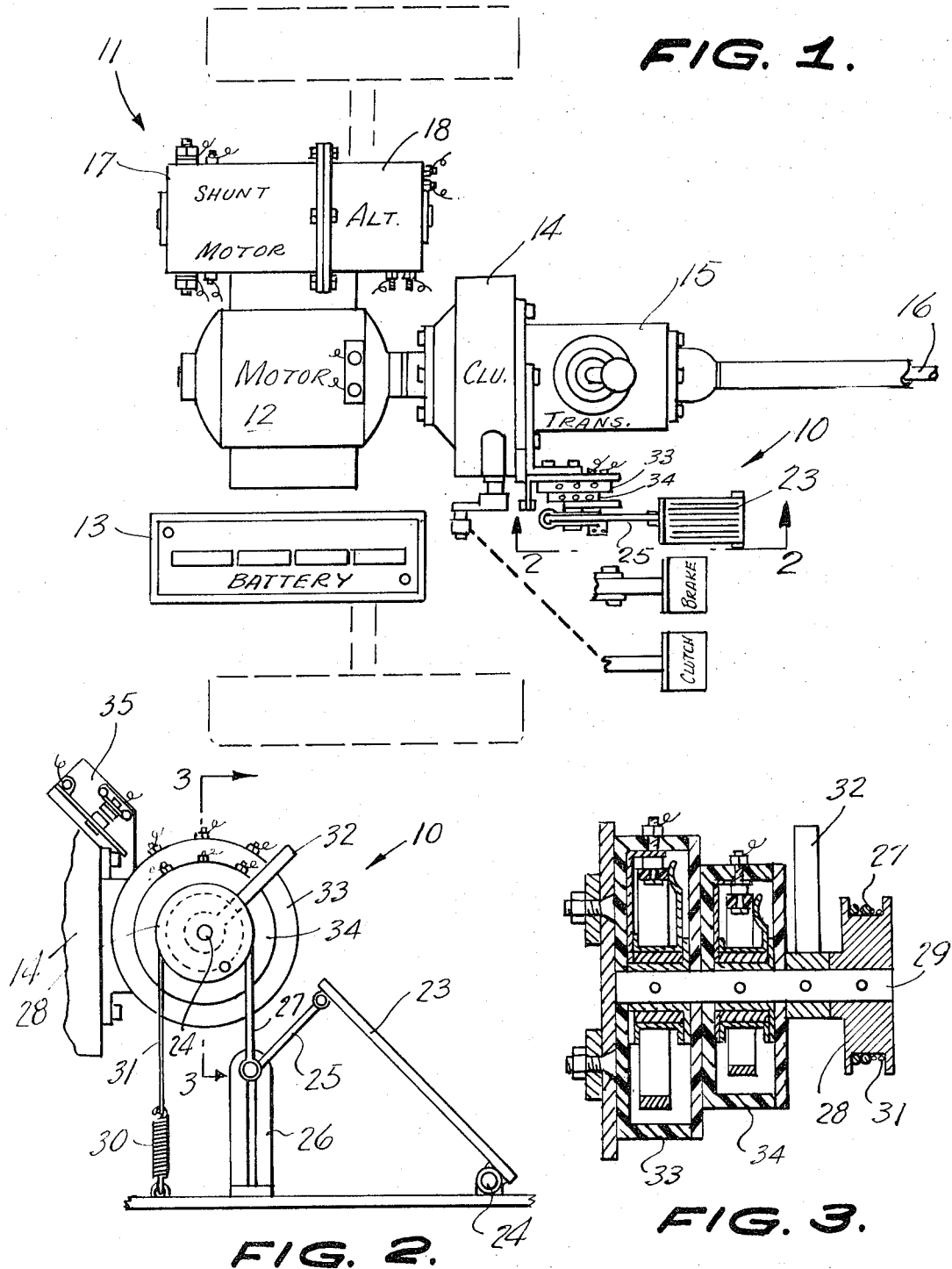

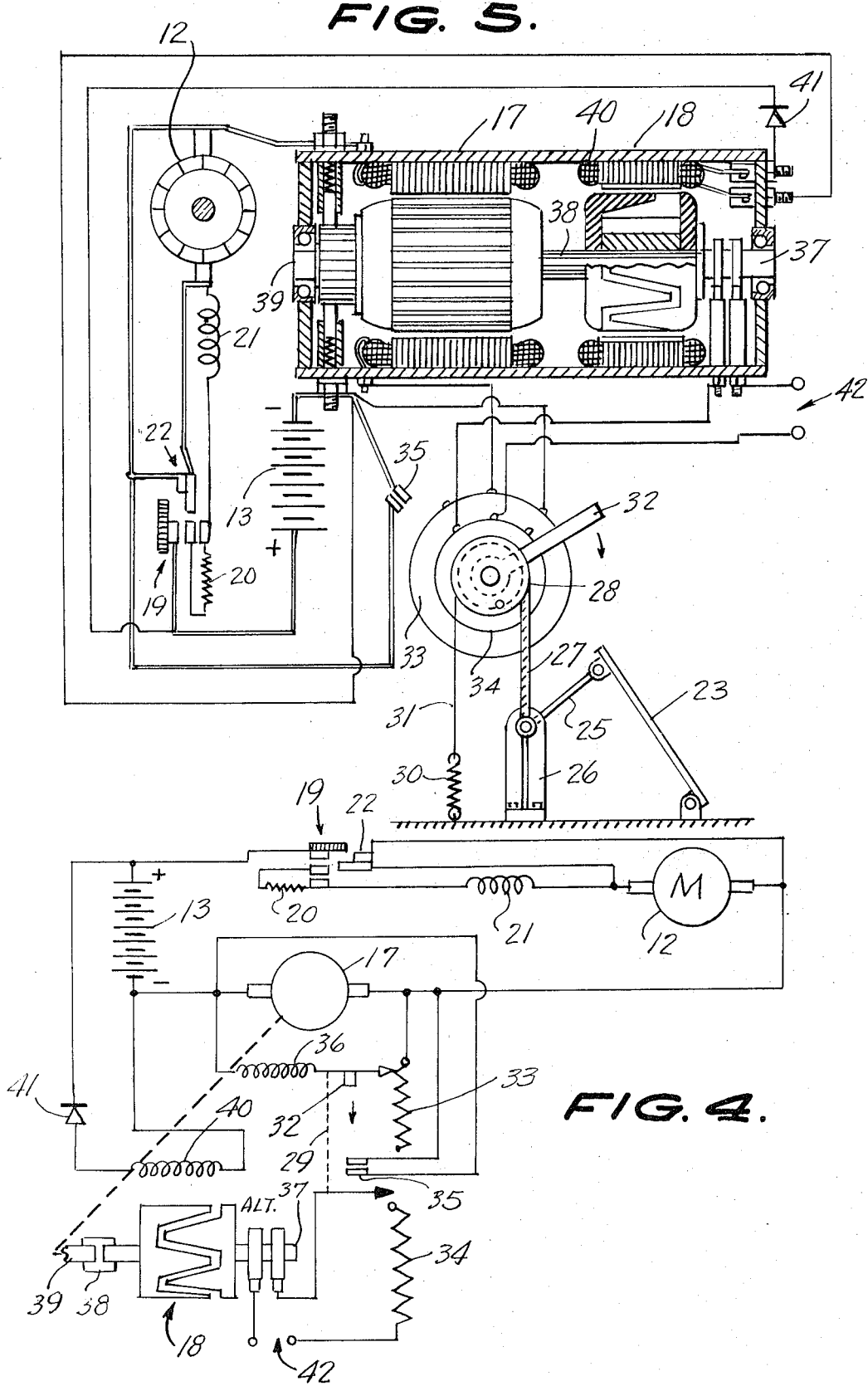

3,826,958

ELECTRIC VEHICLE CONTROL

BACKGROUND OF THE INVENTION

Field of the Invention

The present invention relates to an electric vehicle control for varying the power infinitely from the electric motor.

SUMMARY OF THE INVENTION

An electric vehicle control in which the counter EMF of a DC motor is used by having its spinning armature provide a control of power between the DC source and a power motor. Variations from zero to full power are smooth and infinite and are obtained by varying the speed of the armature by any means. The use of an alternator to load and control the armature puts most of the power back into the battery.

The primary object of the invention is to provide an electric vehicle control which utilizes the EMF of a DC motor and returns power to the battery when used.

Other objects and advantages will become apparent in the following specification when considered in the light of the attached drawings.

BRIEF DESCRIPTION OF THE DRAWINGS

FIG. 1 is a top plan view of the invention;

FIG. 2 is a vertical elevational view taken along the line 2—2 of FIG. 1, looking in the direction of the arrows;

FIG. 3 is an enlarged fragmentary transverse sectional view, taken along the line 3—3 of FIG. 2, looking in the direction of the arrows;

FIG. 4 is a semi-diagrammatic wiring diagram for the apparatus illustrated in FIGS. 1 through 5; and FIG. 5 is an elevational view shown partially in section of the motor control system of the present invention.

DESCRIPTION OF THE PREFERRED EMBODIMENT

Referring now to the drawings in detail, wherein like reference characters indicate like parts throughout the several figures, the reference numeral 10 indicates generally an electric vehicle control constructed in accordance with the invention.

The electric vehicle control 10 is used with an electric vehicle generally indicated at 11 and including an electric motor 12, battery 13, clutch 14, transmission 15 and drive shaft 16 extending rearwardly to wheels not shown.

A shunt motor 17 is mechanically connected to an alternator 18 as can be seen in FIG. 1.

The system of the present invention takes advantage of the counter EMF of a DC motor 17 when running. The spinning armature of the motor 17 makes an ideal control of power between a DC source and a power motor 12. It gives a smooth and infinite variation from zero to full power simply by varying the speed of the armature through an alternator 18 to load and control the armature to thus put most of the power back into the battery. Control does not take much power since the shunt motor 17 takes very little power from the battery 13 when spinning freely, a counter EMF, or bucking reverse voltage to battery 13, is very near to battery voltage.

The motor 17 is started with power switch 19 which momentarily contacts starting resistance 20 to limit circuit surge, with the help of an electric choking action of series field 21 of power motor 12. As switch 19 reaches fully on position it shorts out starting resistance 20 and opens armature shorting switch 22 which prevented the motor 12 from jerking on starting.

An accelerator pedal 23 is mounted on a pivot 24 on the floor board of the vehicle and is connected by a link 25 to a vertically slotted bracket 26. A cable 27 is connected to the lower end of the line 25 and is trained over a pulley 28 mounted on a shaft 29. A spring return 30 is secured to a second cable 31 trained about the pulley 28 to return the accelerator 23 and cable 27 when pressure is removed from the accelerator 23. A lever 32 is connected to the shaft 29 for reasons to be assigned. A circular rheostat 33 and a circular rheostat 34 are operatively connected to the shaft 29 for actuation thereby. A switch 35 is positioned to be actuated by the arm 32 upon rotation of the shaft 29 in a clockwise direction as viewed in FIG. 2. When the switch 22 is open the motor 12 does not turn since the shunt motor 17 is bucking almost all of the battery voltage and current is small through both armature and field 36 of the shunt motor 17. The series field 21 of the motor 12 has few wire turns and provides a very weak field.

The alternator field shaft 37 is connected at 38 to the shaft 39 of the shunt motor 17. The circuit of the alternator field is open at rheostat Also the accelerator pedal 23 is depressed rheostat 34 makes contact to magnetize the alternator field to thus load and slow down the shunt motor 17. This reduces the shunt motor 17 counter EMF passing a heavy current to power motor 12. Additional pressure on foot pedal rotating rheostat 33 decreases current in the shunt field 36 to decrease power needed to slow down the shunt motor 17 while simultaneously the rheostat 34 increases current in the alternator field 18 to further load the shunt motor 17. With accelerator pedal 23 fully depressed the arm 32 contacts generator shorting switch 35 to cut it out of the circuit so as to apply full voltage from the battery to the power motor 12.

The clutch 14 and transmission 15 connected to the power motor 12 permits the electric vehicle 11 to be operated substantially the same as a gasoline powered car.

The alternator 18 is of conventional construction with full wave rectifiers with the field 40 thereof protected by a low voltage cut out diode 41 for charging the battery 13. The battery 13 or any other suitable battery can be connected at 42 to provide the power for the alternator 18.

In the use and operation of the invention the control of the electric motor 12 is supplied by movement of the accelerator 23 rotating the rheostats 33, 34 to thus control the shunt motor 17 which controls the supply of current to the motor 12.

Having thus described the preferred embodiment of the invention it should be understood that numerous structural modifications and adaptations may be resorted to without departing from the spirit of the invention.

What is claimed is:

1. A control for an electric vehicle of the type operated by a series field power motor and battery, comprising a shunt field motor and alternator single shaft unit, said alternator portion of said unit having a rotor field, a rheostat electrically in series with the shunt field of said shunt field motor, a second rheostat electrically in series with said alternator rotor field and battery, said shunt motor electrically connected in series with said series field power motor and battery, said alternator electrically connected to and charging said battery, thereby loading the shunt motor armature to reduce its speed and counter EMF opposing the battery EMF to the series field power motor, and foot pedal means simultaneously actuating said rheostats to variably load said armature to simultaneously weaken the shunt field and strengthen the alternator field.

* * * * *